April 28, 1931.  M. D. YETTA  1,802,997
OPTICAL EXERCISER
Filed July 29, 1929   2 Sheets-Sheet 1
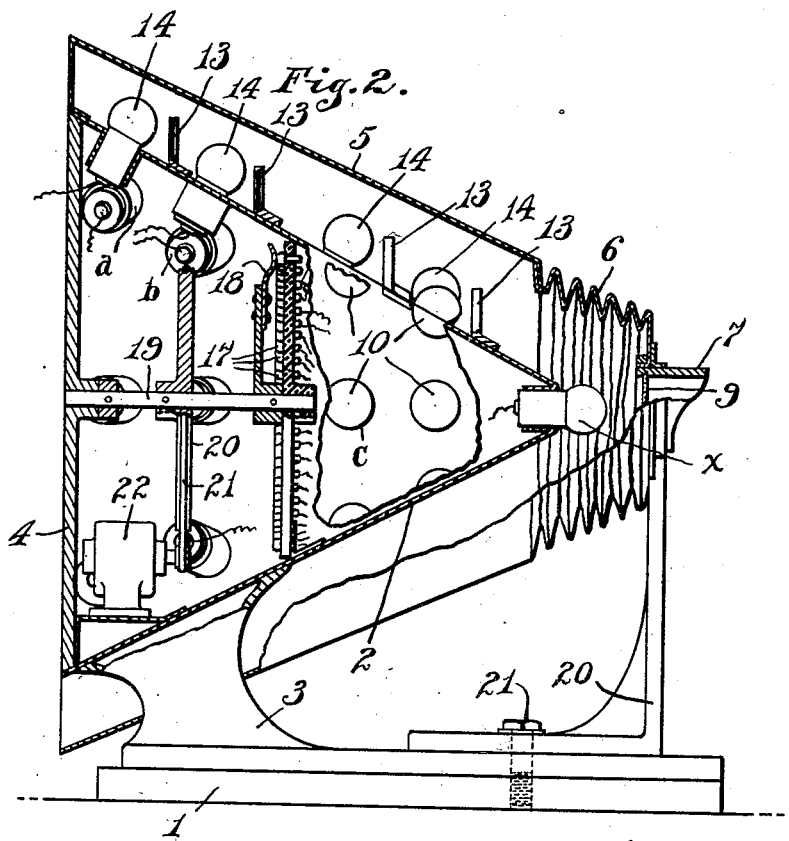
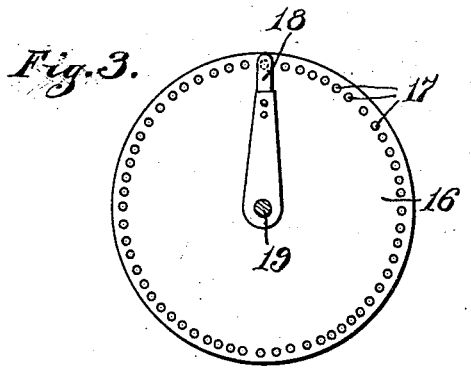
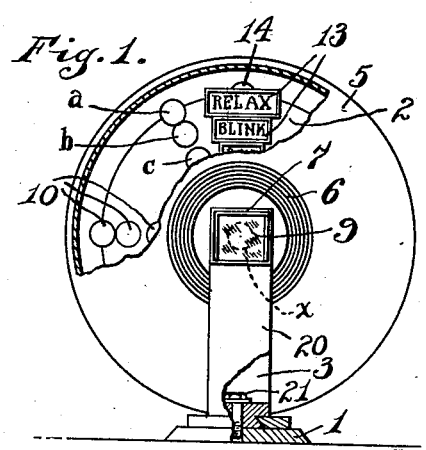
INVENTOR.
Michael D. Yetta,
BY
Hood + Hahn,
ATTORNEYS

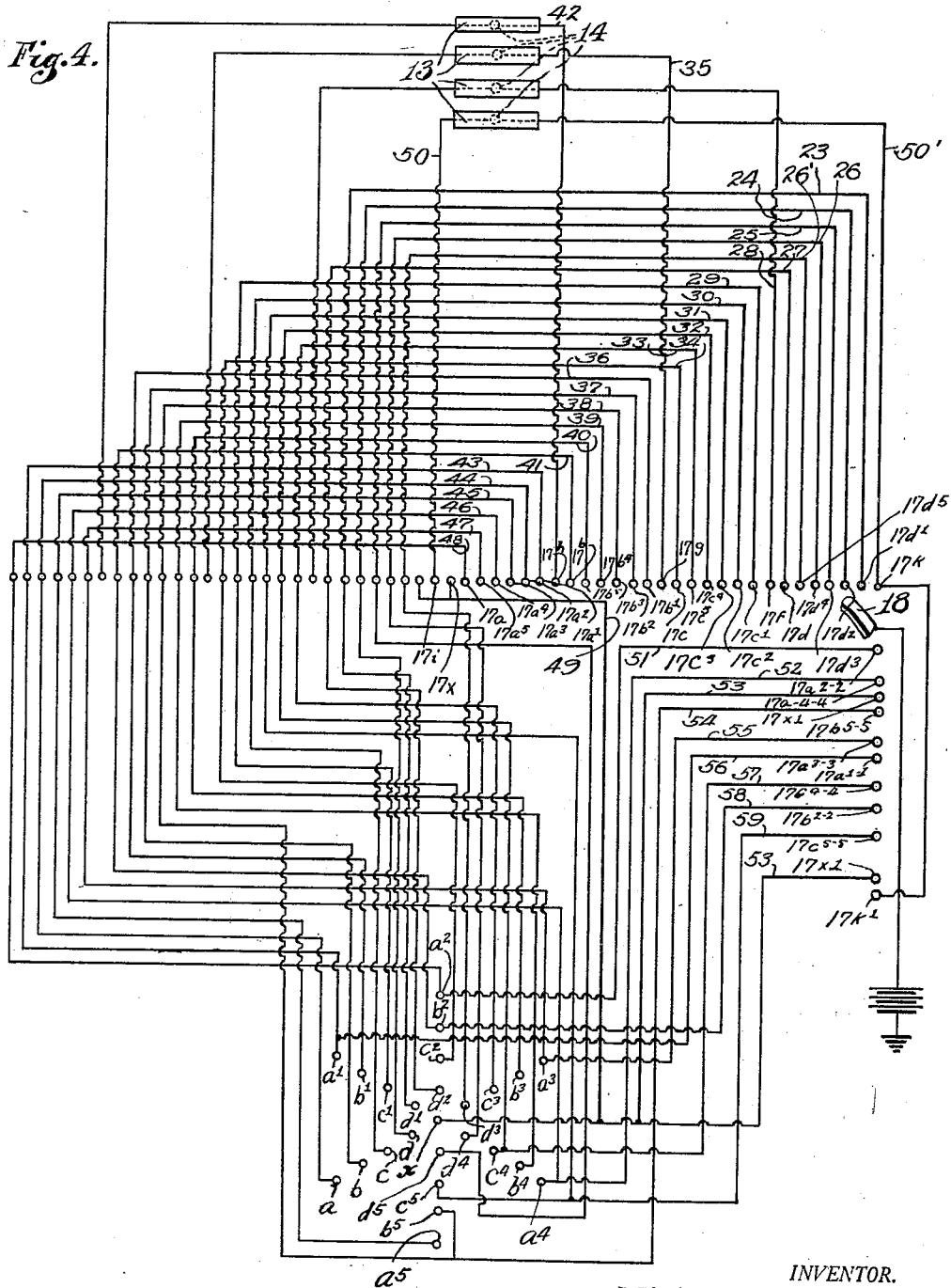

Patented Apr. 28, 1931

1,802,997

UNITED STATES PATENT OFFICE

MICHAEL D. YETTA, OF CONNERSVILLE, INDIANA

OPTICAL EXERCISER

Application filed July 29, 1929. Serial No. 381,936.

My invention relates to improvements in optical exercising apparatus.

It is one of the objects of my invention to provide a device which will assist the patient in exercising the muscles of his eyes by providing a moving light or a series of lights which successively appear and which are adapted to be followed by the patient thereby causing him to "roll" his eyes and also to change the focus thus increasing the activity of the muscles of the eyes and providing muscular exercise.

For the purpose of disclosing my invention, I have illustrated one embodiment thereof in the accompanying drawings, in which:

Fig. 1 is a front elevation partially in section of an apparatus embodying my invention;

Fig. 2 is a longitudinal sectional view;

Fig. 3 is a front elevation of the control disc and

Fig. 4 is a wiring diagram of the circuit controlling the lamps.

In the embodiment of the invention illustrated, I provide a base 1, on which the various parts are mounted and which constitutes a support for the structure. This base supports an internal cone shaped member 2 which is carried on a support 3 extending upwardly from the base and which at its rear end is provided with a disc like back 4. The cone shaped member 2 is surrounded and inclosed by a cone cover member 5. The shape of this, however, is slightly different from that of the internal member so that toward their apices, the cones slightly diverge. The front end of the cover member 5 is provided with a bellows 6 having an eye shade 7 overhanging the observation opening 9. Shade 7 and orifice 9 are carried by an adjustable bracket 20, to which one end of bellows 6 is secured. Bracket 20 may be held in any desired position of adjustment by a clamp 21 so that the eye point may be set at any desired focal distance from the lamps, now to be described.

The cone-supporting member 2 has mounted thereon a plurality of electric lamps 10, which are arranged in several circumferential series $a$, $b$, $c$, etc., and also in radial series, as shown, the arrangement being such that, by appropriately lighting the lamps in desired sequences, either regular or irregular, viewpoints may be established at desired points, variously spaced from the eye of an observer, both as to focal distance and lateral displacement, as that, if the observer take cognizance of these view points, his eye will be caused to move through the various necessary predetermined cycles of movement.

The arrangement of lamps 10 is preferably such as to provide a lamp $x$ at the apex of the combined series.

In addition to the radially and circumferentially disposed rows on the cone member I provide a plurality of sign members 13, which may be of glass carrying indicia thereon as instructions to the patient. Behind each one of these signs there is mounted a lamp 14 which is illuminated at the proper interval.

In the place of the lamps, I may if desired, substitute spark plugs, as I have found in some instances, certain patients' eyes respond more satisfactorily to the observation of a flashing or sparking light than to the light of an electric lamp.

For the purpose of closing the circuit of and thereby activating or causing the successive illumination of the lamps or spark plugs in desired order I provide a controlling disc 16 mounted within the cone 2 and provided with a series of contacts 17 adapted to be wiped by a contact brush 18 mounted on a shaft 19 journalled at one end in the disc 16 and at the opposite end in the rear member 4. This shaft is provided with a driving wheel 20 connected by a belt 21 with a suitable operating motor 22. This motor may be, as shown, an electric motor or any suitable mechanical motor. The motor may, if desired be so arranged as to be capable of driving brush 18 in either direction.

I have found that a very beneficial eye exercise is obtained where the view point is shifted along a spiral helix, so that the eye is forced to roll and to also change its focus, starting or ending with the eye in its normal axis and at a very short focus. I have also found that beneficial results may be obtained by combining, with the above-mentioned exercise, one which involves successive irregular shiftings of the eye and focus.

It will be readily understood that a basis for an almost infinite variety of eye movements may be provided by appropriate wiring connections for the lamps.

In Fig. 4 I indicate one such arrangement where, by sweeping brush 18 from one to the other of the series of contacts 17, the lamps 10 may be energized in spiral series, beginning or ending at the apex lamp $x$ and, at another period, energized at random.

As shown in Fig. 4, the lamps $d1$, $d2$, $d3$, $d4$, $d5$ and $d$ are respectively connected by the conductors 23, 24, 25, 26, 26' and 27 with contacts $17d'$, $17d2$, $17d3$, $17d4$, $17d5$ and $17d$. The contact $17f$ is connected by conductor 28 with one of the lamps 14. The lamps $c1$, $c2$, $c3$, $c4$, $c5$ and $c$ are respectively connected to contacts $17c1$, $17c2$, $17c3$, $17c4$, $17c5$ and $17c$ by conductors 29, 30, 31, 32, 33 and 34. The next succeeding lamp 14 is connected to contact $17g$ by conductor 35. The lamps $b1$, $b2$, $b3$, $b4$, $b5$ and $b$ are respectively connected to the contacts $17b1$, $17b2$, $17b3$, $17b4$, $17b5$ and $17b$ by conductors 36, 37, 38, 39, 40 and 41. The last of the series of lights 14 is connected by conductor 42 with contact $17h$. The lamps $a1$, $a2$, $a3$, $a4$, $a5$ and $a$ are respectively connected to the contacts $17a1$, $17a2$, $17a3$, $17a4$, $17a5$ and $17a$ by conductors 43, 44, 45, 46, 47 and 48. The contact $17x$ is connected by conductor 49 with the light $x$ and one of the lamps 14 is connected by conductor 50 with the contact $17i$. This set of contacts is duplicated from the contact $17i$ and the contact $17k$ is connected by conductor 50' with one of the lamps 14. It is understood that the opposite terminals of the lamps are grounded.

In addition to the above two sets of contacts I provide a third series of contacts wherein the contact $17a2$—2 is connected by conductor 51 with lamp $a2$. Contact $17a4$—4 is connected by conductor 52 with lamp $a4$. The contact $17x'$ is connected by conductor 53 with lamp $x$. The contact $17b5$—5 is connected by conductor 54 with lamp $b5$. The contact $17c3$—3 is connected by conductor 55 with lamp $a3$. The contact $17a1$—1 is connected by conductor 56 with lamp $a1$. The contact $17c4$—4 is connected by conductor 57 with lamp $c4$. The contact $17b2$—2 is connected by conductor 58 with lamp $b2$. A contact $17c5$—5 is connected by conductor 59 with lamp $c5$ and contact $17k1$ corresponding to $17k$ is connected to one of the lamps 14.

It is therefore apparent that with the brush 18 sweeping over the contacts $17k$, $17a1$ etc., to the left as shown in Fig. 4 circuit will be closed through the lamps $d1$, $d2$, $d3$, $d4$, $d5$ and $d$ successively. Circuit will then be closed through one of the lamps 14 and then through the series of lamps $c1$, $c2$ etc., then through another of the lamps 14 and then through the $b$ series lamps, then through another of the lamps 14 and then through the $a$ series of lamps, circuit finally being closed through the center lamp $x$. With the duplicate set of contacts circuit will then again be closed in seriatim as above described. After passing off the last of the second series the contact 18 commencing with the contact $17a2$—2 will then close circuit through the lamps $a2$, $a4$, $x$, $b5$, $a3$, $a1$, $c4$, $b2$, $c5$ and $x$.

I claim as my invention:

1. In an optical exerciser, the combination with a plurality of rows of circular disposed illuminating devices arranged at varying distances from the view point of the patient, of a circuit controller driven constantly in one direction for successively closing the circuits of the lamps in a spiral series first in one direction and then in the opposite direction.

2. In an optical exerciser, the combination with a cone-shaped member having a plurality of rows of lamps arranged thereon, of indicia mounted on said member, lamps for illuminating said indicia, a circuit controlling switch for controlling the circuits of the lamps, and means for driving said switch.

3. In an optical exerciser, the combination with a cone-shaped support, of a plurality of lamps disposed in gradually diminishing circles on said support, a cover member for said support substantially cone-shaped and having a view opening at its apex, an electrical switch controlling the circuits through said lamps for successively closing the circuit through the lamps in one direction and then in the opposite direction, and a motor for driving said switch.

4. In an optical exerciser, the combination with a support, of a plurality of electric lamps arranged in gradually diminishing circular rows on said support, means for successively closing the circuit of the lamps in each row in one direction until the circuit through all of the rows has been completed and then successively closing the circuit through the rows in the opposite direction, and means for continuously driving said circuit closing means in one direction.

5. An optical exerciser comprising a plurality of normally inactivated elements arranged in planes at various distances and in various lateral positions relative to a predetermined vision point and axis, and means for successively activating said elements in predetermined sequence.

6. A device of the character described in claim 5, wherein the elements to be activated are light evolving when activated.

7. A device of the character described in claim 5 wherein the means for successively activating the elements activates them in spiral series relative to a predetermined view point.

8. An optical exerciser comprising a plurality of normally inactivated elements in planes arranged at various distances and in various lateral positions relative to a predetermined vision point and axis, an eye positioner, and means for activating said elements in predetermined sequence.

9. A device of the character described in claim 8 wherein the means for activating the elements is such as to activate them in spiral series and at random.

In witness whereof, I, MICHAEL D. YETTA, have hereunto set my hand at Connersville, Indiana, this 25th day of July, A. D. one thousand nine hundred and twenty-nine.

MICHAEL D. YETTA.